United States Patent
Andrysiak et al.

[11] 3,712,063
[45] Jan. 23, 1973

[54] COOLED PINTLE ASSEMBLY

[75] Inventors: Stanislaw J. Andrysiak, Youngstown, N.Y.; Ronald F. McKenna, Rockford, Ill.

[73] Assignee: Bell Aerospace Company, Division of Textron Inc., Wheatfield, N.Y.

[22] Filed: March 24, 1970

[21] Appl. No.: 24,900

[52] U.S. Cl. .................................. 60/265, 60/271
[51] Int. Cl. ................................................ F02k
[58] Field of Search ............... 60/258, 271, 253, 254

[56] References Cited

UNITED STATES PATENTS

| | | | |
|---|---|---|---|
| 3,451,222 | 6/1969 | Kelly | 60/258 |
| 3,353,359 | 11/1967 | Webb | 60/265 |

FOREIGN PATENTS OR APPLICATIONS

| | | | |
|---|---|---|---|
| 1,268,781 | 6/1961 | France | 60/271 |

Primary Examiner—Samuel Feinberg
Attorney—R. S. Sciascia and Thomas O. Watson, Jr.

[57] ABSTRACT

To maintain a constant pressure in the combustion chamber of a rocket engine, which operates with either liquid and/or metallized propellants, a cooled throat pintle assembly is provided to vary the throat area in an E-D nozzle. The pintle design is a composite structure consisting of a Columbium alloy central rod member having in its cylindrical and injector portions a Grafoil intermediate layer and a Carbitex outer layer. The throat portion of the pintle assembly consists of stacked pyrolytic graphite washers having a spiral formed coolant passages. The throat, cylindrical, and injector portions of the pintle are gas film cooled with fuel-rich gases that are ducted through the center of the pintle from a pressurization system gas generator. The injector or forward end of the pintle is cooled by a gas film exiting from the pintle housing. The throat portion of the pintle is cooled by gases exiting through spiral grooves in the washers.

5 Claims, 3 Drawing Figures

INVENTORS
STANISLAW J. ANDRYSIAK
RONALD F. McKENNA
BY Thomas O. Watson Jr.

ATTORNEY

COOLED PINTLE ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in rocket engines and more particularly it pertains to a new and improved rocket engine throat pintle assembly.

Generally, the application of the present invention will be a prepackaged rocket propulsion engine used for missile propulsion. In the future there will be a greater use of high energy propellants which produce higher temperatures and pressures than in the past. Advanced applications often require high chamber pressures greater than 1,000 psia and high energy propellants which operate at high temperatures, 7500° F, and minimal engine envelope. The severity of this environment dictates the need for a superior throat pintle design which is capable of the durability required and can resist erosion for the duration of operation. The present invention fills this need.

In the present invention, due to the film-cooling feature of the injector deflector plate, only a small amount of heat is absorbed by the injector during operation. However, a larger amount of heat is absorbed by the chamber wall and pintle wall during the firing period, but it is not practical to increase the insulation of the chamber and pintle, since it would increase the weight and heat load as a result of increasing the diameter of the pintle and chamber walls.

The above problems are overcome by the present invention which provides a rocket engine pintle assembly that maintains a constant pressure in the combustion chamber for all degrees of throttling and which can successfully withstand the high temperatures and pressures encountered as a result of using higher energy propellants with low erosion.

SUMMARY OF THE INVENTION

The general purpose of this invention is to provide a cooled and durable throat throttling pintle assembly to be used in an advanced E-D nozzle which operates with either liquid and/or metallized propellants. In considering the materials for use in this assembly, emphasis was placed upon their compatibility with the propellants, thermal transfer to the materials and propellants during operation, and non-operating heat soak and thermal expansion of the moving parts so that binding does not occur which would prevent throttling.

The two materials chosen were Grafoil and pyrolytic graphite due to their compatibility with the combustion gases and the chamber liner-Carbitex. The properties of each material are similar with high compressive strength and erosion resistance at elevated temperatures. Both are extremely anisotropic materials which provide high thermal resistance against the grain and very good thermal conductivity with the grain. However, Grafoil has slightly higher thermal resistance across its parallel planes than pyrolytic graphite, while having approximately equal thermal conductivity along the graphite planes, thereby keeping the heat flux to the injector assembly at a minimal value. Another advantage of Grafoil is that it does have greater formability than pyrolytic graphite; lending itself to shaping and controlled plane orientation. The Grafoil will be bonded to the chamber for preventing a gas leakage path to the composite chamber structure.

The pintle assembly is composed of a central rod member (Columbium or other high temperature strength capable metal) and graphite base materials. The metal rod is overlaid in the cylindrical and injector portions with a graphite base insulator (e.g., Grafoil) and a graphite base, high erosion resistant, combustion zone material (e.g., Carbitex). The throat portion is composed of stacked pyrolytic graphite washers machined to the required pintle throat geometry. The pyrolytic graphite washers are grooved with surface passages. In order to allow for axial thermal expansion (which is highest of all the directions), each washer is coated with a low strength, low melting temperature material (e.g., silver or plastic) which is extruded and melted as the washers heat up and expand. Cooling to the materials capability (4,500° F on the surface) is accomplished by bleeding low temperature gas generator gases (which are used to pressurize the propulsion system tanks) through the central rod member of the pintle assembly.

In this manner, a pintle has been provided which due to its structure and materials can successfully withstand the affects of high temperatures and pressures encountered during combustion as a result of the high energy propellants being used.

OBJECTS OF THE INVENTION

An object of the present invention is the provision of a pintle assembly which satisfies the demands of a reliable, compact expansion-deflection rocket engine nozzle and makes this engine more competitive than prior art design.

Another object is to provide a pintle assembly which is capable of throat area variation and thrust modulation and has potential long life, dimensional integrity, low weight and high reliability.

A further object of the invention is the provision of a pintle assembly having a cooling requirement that is only a small fraction of the total generated gases which results in high system performance.

Other objects, advantages and novel features of the invention will become apparent from the following detailed description of the invention when considered in conjection with the accompanying drawings.

DESCRIPTION OF THE PREFERRED EMBODIMENTS

Figure 1:
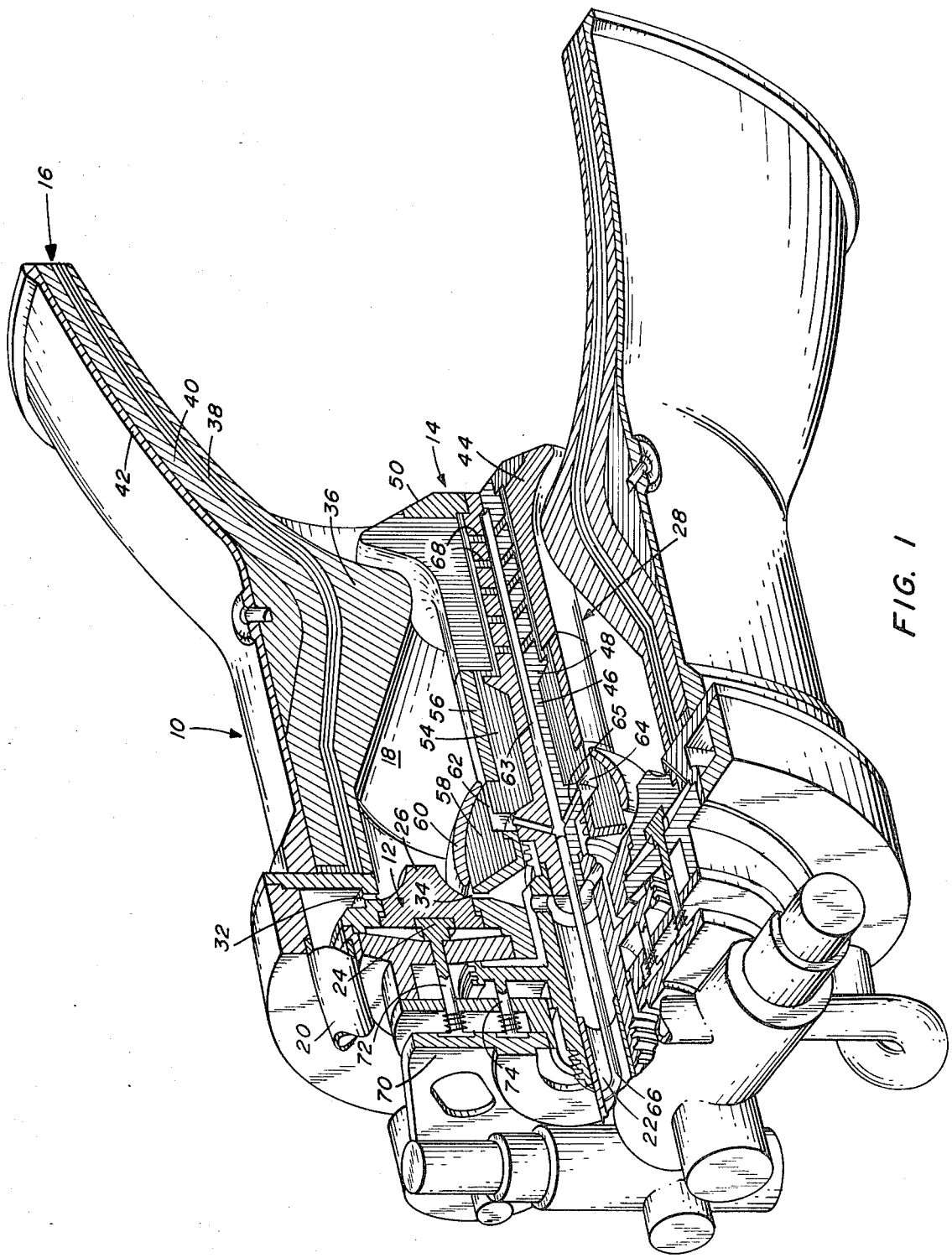
FIG. 1 is a perspective view, partially in section, of a rocket engine incorporating the preferred embodiment of the invention.
Figures 2, 3:
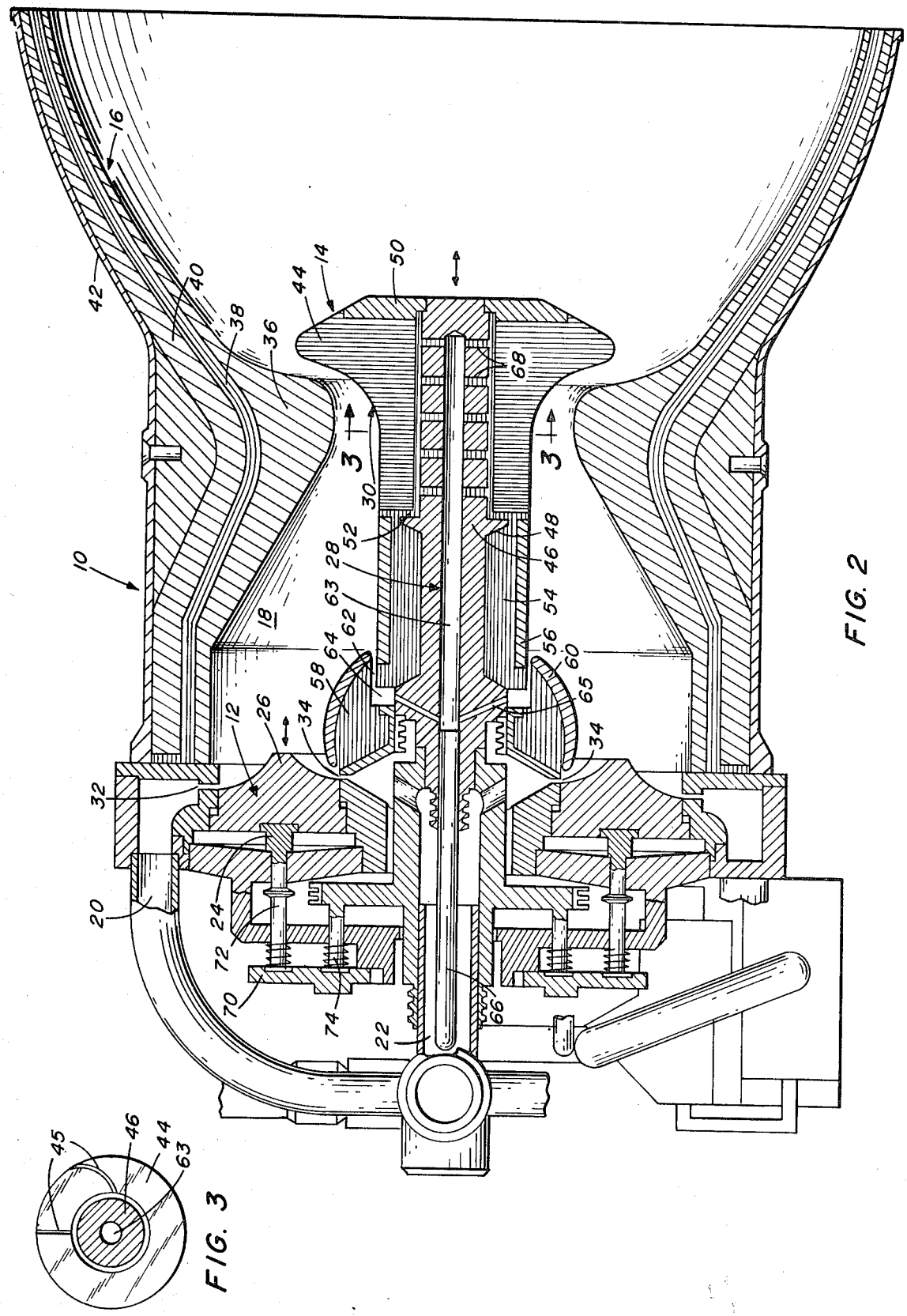
FIG. 2 is a side elevation, in section, of the pintle assembly shown in FIG. 1.
FIG. 3 shows a section of a washer taken on line 3—3 of FIG. 2 looking in the direction of the arrows.

Referring in detail to FIGS. 1 and 2 of the drawings, a bipropellant rocket engine is illustrated having a thrust chamber 10, an injector assembly 12 at the head end of the thrust chamber, and a pintle assembly 14 which is coaxially arranged in thrust chamber 10. The thrust chamber 10 consists of an expansion-deflection exhaust nozzle 16 and an ablative combustion chamber 18. The injector assembly 12 is composed of fixed and movable portions. The fixed portions are a peripherial oxidizer manifold 20 and a central fuel manifold 22. The movable portions are the annular throttle piston 24 and propellant deflector plate 26 which moves in a direction opposite to the central throat pintle 14. The deflector plate 26 is located on the front of throttle piston 24 and has two annular concave surfaces formed thereon. The pintle assembly 14 consists of a cylindrical portion 28, an injector portion adjacent the injector assembly 12 and a plug portion 30 which varies the throat area of the exhaust nozzle 16.

The propellants are injected through circumferentially spaced oxidizer injector slots 34 and flow over the deflector plate 26 to form circumferential sheets. This structure and operation is described with greater particularity in a copending application, Ser. No. 24,901, in the names of C. M. Schmidt, Frank Bond and Ronald F. McKenna filed on Mar. 24, 1970 and assigned to the assignee of the present application. The propellants may be two liquids or they may be a liquid oxidizer and a semi-liquid fuel, such as metallized fuel. Upon demand, throttling is accomplished by the movement aft of the annular deflector plate 26. Simultaneously with the displacement of the deflector plate 26, the throat pintle assembly 14 moves forward so that the plug portion 30 can reduce the throat area of the exhaust nozzle 16.

The ablative thrust chamber 10 is designed as a composite structure, to better resist combustion heat and pressure, consisting of an inner layer 36 formed of a graphite base, high erosion resistant, combustion zone material, e.g., Carbitex, which is a graphite cloth material that has been graphitized, having trace impurities; an intermediate layer 38 formed of a graphite base insulator, e.g., Grafoil, which is a flexible form of pyrolytic graphite, having trace impurities; and a silica phenolic, e.g., Refrasil, in the outer region 40 encased in a metal shell of Inconel 718. Compatible gas side wall thermal conditions are effected by fuel-rich peripheral combustion zone gases generated by an unbalanced injector technique. The injector assembly 12 is fabricated of Nickel-A and Inconel 718, and is welded to the thrust chamber shell 42 to prevent combustion gas leakage.

The design of pintle assembly 14 is also a composite structure. The throat portion 30 of pintle assembly 14 employs pyrolytic graphite due to the extremely severe environment to which the pintle tip is subjected. Pyrolytic graphite is one of the few materials that can survive this environment without a protective coating if the driving gas temperature is below its sublimation point. Furthermore, due to the inherent nature of the delamination anomaly of pyrolytic graphite, the design of the throat portion 30 is limited to a stacked ring (washer) approach. The high conductivity plane of the pyrolytic graphite rings or washers 44 is orientated radially for even heat distribution in each washer wherein the heat flux varies in accordance with its axial station. In addition, as seen in FIG. 3, each of the washers 44 has radial or spiral formed grooves 45 for film-cooling of the surface of the throat portion 30 of the pintle, thereby providing a relatively cooled gas boundary layer. Grooves 45 may be of any shape such as radial lines or curves, as shown in FIG. 3. Consequently, the gas film protects the washers edges from reaching the sublimation point and thus preventing erosion of the pintle surface.

The central core member of the pintle assembly 14 is a Columbium alloy rod 46 which is machined to the configuration shown in FIG. 2. The WC-129Y Columbium alloy was chosen due to its excellent fabrication properties and high strength at elevated temperatures.

The washers 44 are held in compression by a lip 48 on the rod member 46 of the pintle assembly 14 and a metal ring 50 which is welded to the pintle in the throat portion 30. The ring 50 which retains the pyrolytic graphite washers 44 is also fabricated from the WC-129Y Columbium alloy for the same reasons as rod member 46 and also for its weld-joint compatibility. It has been calculated that the axial thermal expansion of the washers will be on the order of 0.100 inches. This axial thermal expansion occurs during the initial firing. Therefore, in order to accommodate the initial assembly of the pintle 14, the pyrolytic graphite washers 44 are each coated on one face with a low melting temperature filler 52, such as silver or plastic. Upon engine start up, the combination of gas generator pintle cooling gases, combustion gases and axial thermal expansion of the washers 44 melt and extrude the filler 52. The pyrolytic graphite washers will expand axially and the pintle is sized so as to place a compressive force on the washers at the full washer expansion.

In accordance with the invention, the central rod member 46 is insulated for two main reasons: to help combat heat soak back to the injector assembly 12 and to lower the temperature so that a less costly and more reliable structural material can be employed. The cylindrical portion 28 of rod 46 is first insulated by a tape wound Grafoil layer 54 which is subsequently laminated to form an integral structure. To keep the Grafoil in compression an increase the erosion resistance, a Carbitex filament wound shell 56 is wound over the Grafoil. The Carbitex filament structure 56 is geodesically wound to produce a high hoop strength structure to maintain the Grafoil 54 in compression. An additional insulative structure encapsulates the injector or forward end of the pintle 14 adjacent to injector assembly 12 to minimize heat soak back to the injector. The insulator material is a Grafoil layer 58 and a Carbitex filament outside liner 60 for erosion resistance.

To increase the reliability of the pintle and further reduce the heat soak back to the injector assembly 12, a film-coolant station 62 (see FIG. 1) is provided at the injector end of the pintle adjacent to the injector assembly 12. The gas coolant is fed from an inner duct 63 of the rod member 46 to circumferential slot 64, formed by the Grafoil insulation 58 and the rod member 46, via radial holes 65. The Columbium alloy rod 46 also contains a coolant gas manifold 66, which through a series of circumferential holes 68, feeds the pyrolytic graphite washer structure 44 and also feeds the circumferential slot 64 for gaseous film injection. As the coolant gas is fed through the radial holes 68 it enters the combustion chamber 18 via grooves 45 in the pyrolytic graphite washers 44. The base of the throat portion 30 is coated to prevent oxidation of the Columbium metal by its environment (atmosphere and the combustion gases). The coating is Aluminide which has been found to be an excellent performer in this environment.

The displacement of the annular throttle piston 24 and the throat pintle assembly 12 is accomplished utilizing cam surfaces which are machined on the face of cam gear 70. The cam surfaces contact extensions 72 and 74 of the throttle piston 24 and throat pintle 12, respectively. As the cam gear 70 rotates, the throttle piston 24 and throat pintle 12 are displaced in opposite directions as a result of the cam action between the extensions 72 and 74 on the cam surfaces on the face of gear 70. In this manner a constant pressure is maintained in the combustion chamber for all degrees of throttling. This structure and operation is described with greater particularity in a copending application, Ser. No. 24,897, in the name of Ronald F. McKenna, filed on Mar. 24, 1970 and assigned to the assignee of the present application.

Obviously many modifications and variations of the present invention are possible in the light of the above teachings.

What is claimed is:

1. A pintle assembly for varying thrust in a bipropellant rocket engine comprising:
   a structural rod member forming the core of the pintle assembly;
   a plurality of stacked washers being coaxially disposed on one end of said rod member and defining a throat portion;
   said rod member having a central passage through which gas is ducted to cool the pintle assembly;
   said washers being grooved to permit cooling gas to flow through said washers from said central passage and cool the surface of the pintle assembly to prevent erosion;
   an inner and outer layer of graphite base materials being coaxially disposed on and affixed to an opposite end of said rod member to insulate the rod member from the high temperatures and pressures of combustion and increase the erosion resistance of the pintle assembly;
   said inner layer of graphite base material being a flexible form of pyrolytic graphite and said outer layer being a graphite cloth material, which has been graphitized.

2. A pintle assembly according to claim 1 wherein said rod member is formed of a Columbium alloy and said washers are formed of pyrolytic graphite.

3. A pintle assembly according to claim 2 wherein a plurality of radial cooling holes are formed in the throat portion of said rod member to permit cooling gas to flow from said central passage and feed said washers via said cooling holes.

4. A pintle assembly according to claim 3 wherein filler material is coated on one face of each of the pyrolytic graphite washers to accommodate the initial assembly and ultimate thermal expansion of the pintle.

5. A pintle assembly according to claim 4 having means to actuate said pintle to vary the thrust of the rocket engine by varying the throat area of the exhaust nozzle in order to maintain the pressure in the combustion chamber constant for all degrees of throttling.

* * * * *